(12) United States Patent
Kerbiquet et al.

(10) Patent No.: US 8,607,613 B2
(45) Date of Patent: Dec. 17, 2013

(54) METHOD FOR INDEPENDENT ALIGNMENT OF AN INERTIAL UNIT FOR AN ONBOARD INSTRUMENT OF AN AIRCRAFT

(75) Inventors: Anne Kerbiquet, Chatellerault (FR); Johan Bresciani, Chatellerault (FR); Gaël Mulhaupt, Poitiers (FR); Phillippe Chesne, Vendôme (FR)

(73) Assignee: Thales, Neuilly sur Seine (FR)

( * ) Notice: Subject to any disclaimer, the term of this patent is extended or adjusted under 35 U.S.C. 154(b) by 677 days.

(21) Appl. No.: 12/809,589

(22) PCT Filed: Dec. 2, 2008

(86) PCT No.: PCT/EP2008/066642
§ 371 (c)(1),
(2), (4) Date: Oct. 1, 2010

(87) PCT Pub. No.: WO2009/083373
PCT Pub. Date: Jul. 9, 2009

(65) Prior Publication Data
US 2011/0005298 A1    Jan. 13, 2011

(30) Foreign Application Priority Data
Dec. 21, 2007    (FR) ..................... 07 09042

(51) Int. Cl.
*G01C 17/38*    (2006.01)

(52) U.S. Cl.
USPC .......................................... 73/1.78

(58) Field of Classification Search
USPC .......................................... 73/1.78
See application file for complete search history.

(56) References Cited

U.S. PATENT DOCUMENTS 4,303,978 A    12/1981    Shaw et al.

FOREIGN PATENT DOCUMENTS

| GB | 955175 | 4/1964 |
|----|--------|--------|
| GB | 978710 | 12/1964 |
| WO | 2006025825 | 3/2006 |

*Primary Examiner* — Peter Macchiarolo
*Assistant Examiner* — Alex Devito
(74) *Attorney, Agent, or Firm* — Baker & Hostetler LLP (57) ABSTRACT

A method for independent alignment of an inertial measurement unit for a stand-by instrument in an aircraft includes: determining a status of the aircraft, that is to say whether or not the aircraft is in flight, and in the case where the aircraft is detected as being in flight, carrying out a flight alignment, and in the case where the aircraft is not detected as being in flight, determining a stability of the aircraft, that is to say whether the aircraft is on the ground or at sea, and in the case where the aircraft is detected as being on the ground, carrying out a ground alignment, and in the case where the aircraft is detected as being at sea, carrying out a sea alignment.

16 Claims, 7 Drawing Sheets

METHOD FOR INDEPENDENT ALIGNMENT OF AN INERTIAL UNIT FOR AN ONBOARD INSTRUMENT OF AN AIRCRAFT

CROSS-REFERENCE TO RELATED APPLICATIONS

This application is a National Stage of International patent application PCT/EP2008/066642, filed on Dec. 2, 2008, which claims priority to foreign French patent application No. FR 07 09042, filed on Dec. 21, 2007, the disclosures of which are incorporated by reference in their entirety.

FIELD OF THE INVENTION

The invention relates to a method for independent alignment of an inertial measurement unit for an onboard instrument which can equip an aircraft. The invention relates in particular to a method for independent alignment of an inertial measurement unit for a stand-by instrument generating and displaying aircraft speed, altitude and attitude information. It is particularly useful for aligning inertial measurement units in all possible alignment conditions. In particular, the invention is suitable for equipping aircraft able to take off from non-stabilized platforms, such as oil rig platforms, aircraft carriers and helicopter carriers. It can also be applied for the alignment of inertial measurement units equipping aircraft taking off from stable platforms, such as a runway, insofar as the aircraft can be subjected to movements, even when stopped, for example because of the wind or of services around the aircraft. It can furthermore be applied for the alignment of inertial measurement units when the aircraft is in flight.

BACKGROUND OF THE INVENTION

Stand-by instruments are autonomous onboard instruments generating and displaying flight information that is essential to the pilot of an aircraft in the event of failure of primary onboard instruments. This flight information, generally obtained with lower precision than that of the primary onboard instruments, essentially relates to the speed, altitude and attitude of the aircraft. In order to guarantee the autonomy of the stand-by instruments with respect to the primary onboard instruments, the stand-by instruments must have their own sensors in order to generate and display the speed, altitude and attitude of the aircraft. In particular, the stand-by instruments usually comprise a static pressure sensor, a total pressure sensor and an inertial measurement unit.

The static and total pressure sensors are respectively connected to a static pressure port and a total pressure port located on the skin of the aircraft. The static pressure makes it possible to determine the altitude of the aircraft. The difference between the total pressure and the static pressure makes it possible to determine the speed of the aircraft with respect to the air.

The inertial measurement unit comprises for example three gyrometers and two or three accelerometers. The gyrometers measure the speeds of rotation of the sensor's reference system, in this case a system of axes related to the stand-by instrument, with respect to an inertial reference system. By integration of the rotation speeds, it is possible to know the orientation of the stand-by instrument with respect to the inertial reference system and therefore, knowing the orientation of the stand-by instrument with respect to the aircraft and the orientation of the local geographic reference system with respect to the inertial reference system, it is possible to know the orientation of the aircraft with respect to the local geographic reference system. The orientation of the aircraft with respect to the local geographic reference system, called the attitude of the aircraft, is referenced with respect to a roll axis, a pitch axis and a yaw axis and the movements about these axes are called the roll, the pitch and the yaw respectively. The accelerometers measure non-gravitational forces applied to the aircraft, from which are derived accelerations of translation of the reference system of the sensor with respect to the inertial reference system. The combination of the gyrometers and the accelerometers allows a precise determination of the attitude of the aircraft, the data provided by the accelerometers being used in preference to the data provided by the gyrometers in the static or quasi-static flight phases, and the data provided by the gyrometers being used in preference to the data provided by the accelerometers during dynamic flight phases.

During the powering up of an aircraft and in particular of a stand-by instrument, the inertial measurement unit of the stand-by instrument must be initialized in order to provide attitude information which is as reliable as possible during the flight. This initialization comprises an alignment phase notably consisting in estimating a drift of each gyrometer, that is to say a rotation speed measured by the gyrometer in question in the absence of any movement of the latter. As gyrometers are electronic sensors, their drift can differ between two switch-ons of the inertial measurement unit, to such a degree as to make any measurement carried out by these gyrometers and therefore any attitude displayed by the stand-by instrument useless. It is therefore necessary to determine the drift of the gyrometers at each switch-on. However, the switching on of the stand-by instrument can take place whilst the aircraft is standing on a stable platform, for example a runway, on an unstable platform, for example an oil rig platform, an aircraft carrier or a helicopter carrier, or even when it is in flight, after a more or less brief cut-off of the electrical power supply of the stand-by instrument. When the aircraft is standing on an unstable platform or when it is in flight, the alignment of the inertial measurement unit takes into account measurements of drifts due, not only to the intrinsic drifts of the inertial measurement unit, but also of the movements of the aircraft. In particular, the alignment can take into account movements due to wave motion when the aircraft is standing on an oil rig platform and movements due to atmospheric disturbances when it is in flight. Consequently, the alignment can be falsified by the movement of the aircraft.

In order to ensure the correct alignment of the inertial measurement unit, it is known to check for the presence or absence of movements of the inertial measurement unit by means of accelerometers of the inertial measurement unit. Throughout the whole of the duration of the alignment, the accelerometers measure the non-gravitational forces of the inertial measurement unit with respect to the inertial reference system. In the case of movement of the inertial measurement unit during the alignment, measured by the accelerometers, the stand-by instrument, at the end of the alignment, invalidates the determination of the drift of each gyrometer, displays a message indicating to the pilot the detection of movement and requesting the pilot to restart the alignment either by switching off the stand-by instrument and then switching it on again, or by pressing a button on the front face of the stand-by instrument. This restarting of the alignment is imperative insofar as the availability of the stand-by instrument, and therefore the alignment of the inertial measurement unit, is a necessary condition for the authorization of the take-off of the aircraft. Such a solution has several disadvantages. A first disadvantage is reaching the end of the alignment in order to indicate the detection of a movement during the alignment. It is therefore only at the end of the alignment of the gyrometers that the pilot knows of the invalidation of the alignment and can restart it. Consequently, the time elapsed between the detection of movement and the end of the alignment is wasted. A second disadvantage is the loss of the estimation of the drifts carried out between the start of the alignment and the detection of a movement. At the end of the invalidated alignment, the whole alignment procedure is restarted, the estimated drift risking having being falsified by the movement of the inertial measurement unit. If the alignment is restarted by a hardware reset, that is to say by switching off the stand-by instrument and then switching it on again, there is an even greater risk that the drift of the gyrometers will change, making the previous determination of the drifts obsolete. A third disadvantage is the impossibility of being able to carry out an alignment in certain situations. This can notably arise when the aircraft is started up on a moving platform. In most cases, the movement of the platform, for example due to the wave motion of the sea, cannot be prevented. The aircraft must therefore wait for the movement to stop, in this case for the wave motion to become calm, in order to be able to take off. Such an immobilization is incontestably harmful to the profitability of aircraft. Similarly, when the aircraft is in flight, the stand-by instrument risks being subjected to movements due to the piloting of the aircraft and to disturbances of the air surrounding the aircraft. Even though the pilot can limit the movements due to the piloting of the aircraft, he cannot prevent movements due to air disturbances. The alignment of the inertial measurement unit cannot therefore be carried out.

SUMMARY OF THE INVENTION

A purpose of the invention is notably to overcome all or some of the aforesaid disadvantages. For this purpose, the invention relates to a method for independent alignment of an inertial measurement unit for an onboard instrument which can equip an aircraft, characterized in that it comprises the following steps:
  determining a status of the aircraft, that is to say whether or not the aircraft is in flight,
  in the case where the aircraft is detected as being in flight:
    carrying out a flight alignment,
  in the case where the aircraft is not detected as being in flight:
    determining a stability of the aircraft, that is to say whether the aircraft is on the ground or at sea,
    in the case where the aircraft is detected as being on the ground:
      carrying out a ground alignment,
    in the case where the aircraft is detected as being at sea:
      carrying out a sea alignment.

The invention is notably advantageous in that it allows the alignment to be completed with the same precision whatever the conditions in which the aircraft is may be, the alignment being adapted to these conditions.

BRIEF DESCRIPTION OF THE DRAWINGS

The invention will be better understood and other advantages will appear on reading the detailed description of an embodiment given by way of example and with reference to the appended drawings in which.

DETAILED DESCRIPTION

The following description is given in relation to a stand-by instrument. It is of course possible to implement the invention for any onboard instrument comprising an inertial measurement unit.

Figure 1:
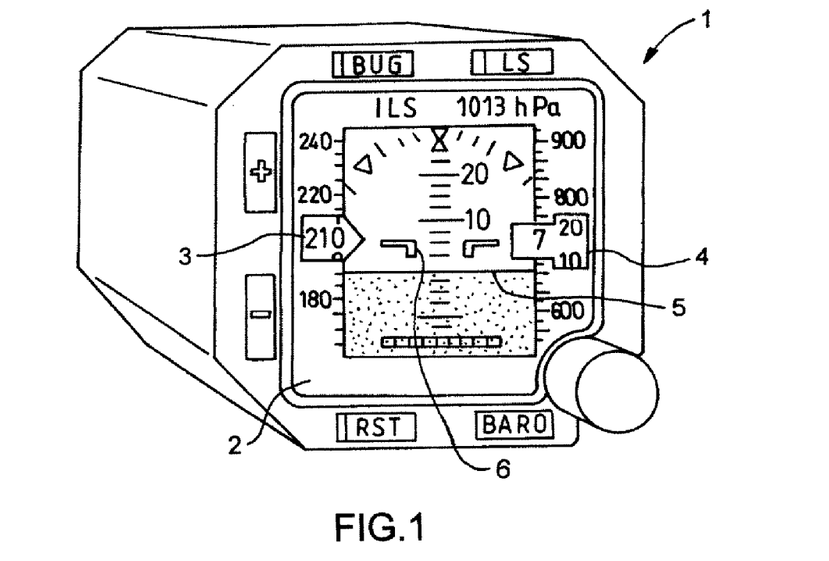
FIG. 1 shows a stand-by instrument able to equip an aircraft.

FIG. 1 shows a stand-by instrument 1 able to equip an aircraft. The stand-by instrument 1 comprises a display device 2, for example a liquid crystal display. The display device 2 displays flight information essential for the piloting of the aircraft. This information notably relates to the airspeed, the altitude and the attitude of the aircraft. The airspeed and the altitude of the aircraft are represented in the form of scrolling vertical graduated scales, one scale 3 indicating the airspeed of the aircraft and one scale 4 indicating the altitude of the aircraft. The attitude of the aircraft is symbolized by a horizontal line 5 which is mobile with respect to a fixed silhouette 6 representing the aircraft. The airspeed and altitude items of information are obtained from anemo-barometric sensors connected on the one hand to pressure pickups disposed on the skin of the aircraft and on the other hand to a computer. The anemo-barometric sensors provide a static pressure Ps and a total pressure Pt of the air surrounding the aircraft from which the computer determines the airspeed and the altitude of the aircraft. The attitude of the aircraft is obtained from an inertial measurement unit comprising gyrometers and accelerometers, as explained below. The anemo-barometric sensors, the inertial measurement unit and the computer form means of determination of the flight parameters. These determination means are independent because they are part of the stand-by instrument 1 and can operate without any other information other than that coming from the pressure sensors.

Figure 2:
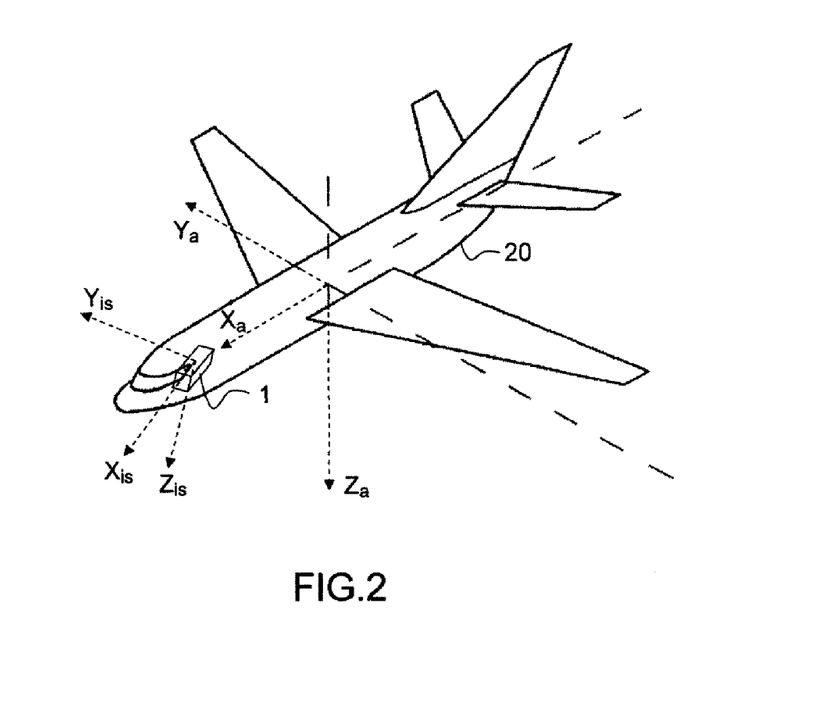
FIG. 2 shows an aircraft equipped with the stand-by instrument shown in FIG. 1, the aircraft and the stand-by instrument each having a system of axes.
Figure 3:
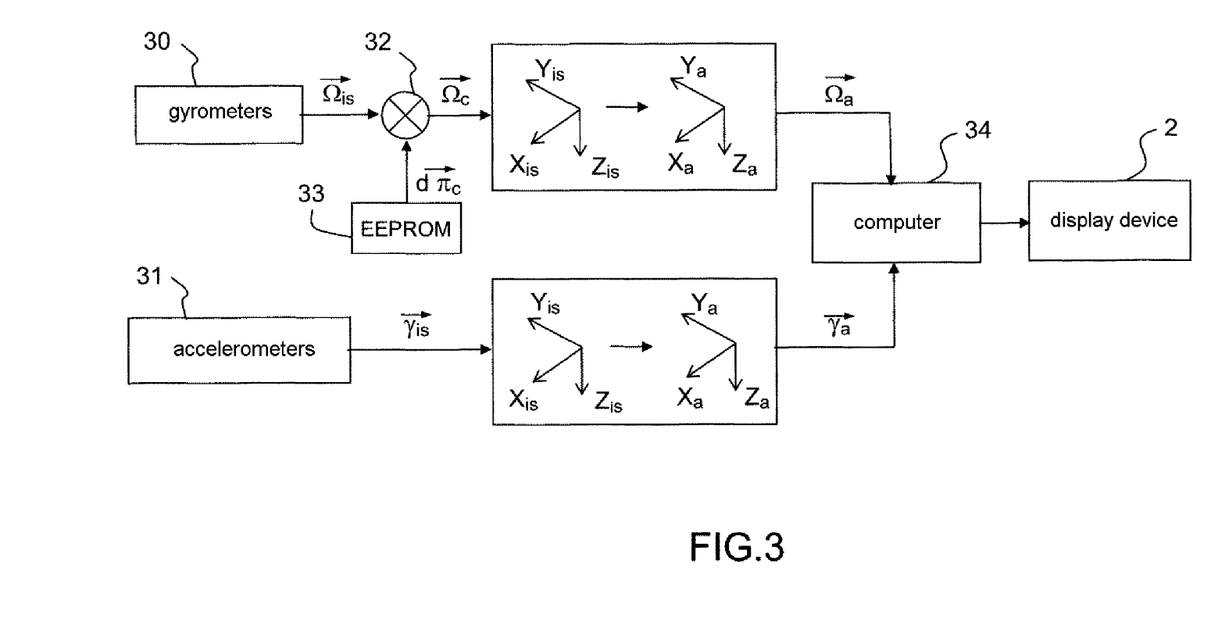
FIG. 3 is a block diagram of the means used by the stand-by instrument for the calculation and display of the attitude of the aircraft.

FIG. 2 shows an aircraft 20 equipped with the stand-by instrument 1 and FIG. 3 is a block diagram of the means used by the stand-by instrument 1 for the calculation and display of the attitude of the aircraft 20. The inertial measurement unit 1 generally comprises three gyrometers 30 and three accelerometers 31. The gyrometers 30 measure the angular velocities $\vec{\Omega}_{is}$ of a reference frame $R_{is}(\vec{X}_{is}, \vec{Y}_{is}, \vec{Z}_{is})$ associated with the stand-by instrument 1 with respect to an inertial reference frame. For the readability of the description it will be possible to ignore the movements of the earth and to consider a local geographic reference frame, called the terrestrial reference frame $R_t(\vec{X}_t, \vec{Y}_t, \vec{Z}_t)$, as being the inertial reference frame. For an implementation of the invention, it will however be possible to take account of the movements of the earth with respect to the inertial reference frame. As shown in FIG. 3, the angular velocities $\vec{\Omega}_{is}$ of the inertial measurement unit are corrected by means of an internal drifts $\vec{d\Omega}_c$ operator 32 of the inertial measurement unit, the vector $\vec{d\Omega}_c$ representing the components of the internal drifts of the inertial measurement unit, for example a drift by a gyrometer 30. The internal drifts $\vec{d\Omega}_c$ are for example stored in a random access memory 33. Means for determining the internal drifts $\vec{d\Omega}_c$ will be described below. The angular velocities thus corrected and indicated $\vec{\Omega}_c$ in the reference frame $R_t(\vec{X}_t, \vec{Y}_t, \vec{Z}_t)$ are transformed in order to obtain angular velocities of $\vec{\Omega}_a$ reference frame associated with the aircraft 20 and written $R_a(\vec{X}_a, \vec{Y}_a, \vec{Z}_a)$ with respect to the reference frame $R_t(\vec{X}_t, \vec{Y}_t, \vec{Z}_t)$. Similarly, the accelerometers 31 measure translational accelerations $\vec{\gamma}_{is}$ of the reference frame $R_{is}(\vec{X}_{is}, \vec{Y}_{is}, \vec{Z}_{is})$ associated with the stand-by instrument 1 with respect to the terrestrial reference frame $R_t(\vec{X}_t, \vec{Y}_t, \vec{Z}_t)$. These translational accelerations $\vec{\gamma}_{is}$ are also transformed in order to obtain translational accelerations $\vec{\gamma}_a$ of the reference frame $R_a(\vec{X}_a, \vec{Y}_a, \vec{Z}_a)$ associated with the aircraft 20 with respect to the reference frame $R_t(\vec{X}_t, \vec{Y}_t, \vec{Z}_t)$. The angular velocities $\vec{\Omega}_a$ and the translational accelerations $\vec{\gamma}_a$ make it possible to determine the attitude of the aircraft 20 with respect to terrestrial reference frame $R_t(\vec{X}_t, \vec{Y}_t, \vec{Z}_t)$ by means of a computer 34 which is part of the inertial measurement unit. Advantageously, the computer 34 also carries out the transformations of angular velocities and translational accelerations. In a particular embodiment, only the translational accelerations $\vec{\gamma}_a$ are used for the determination of the attitude of the aircraft 20 when it is in stabilized flight. Conversely, only the angular velocities $\vec{\Omega}_a$ are used for the determination of the attitude of the aircraft 20 when it is in dynamic flight. Other embodiments are possible. In particular, it is possible to use a weighting of the translational accelerations $\vec{\gamma}_a$ and of the angular velocities for the determination of the attitude of the aircraft 20, this weighting being able to vary as a function of the flight conditions. The attitude of the aircraft 20 is displayed on the display device 2 of the stand-by instrument 1.

Figure 4:
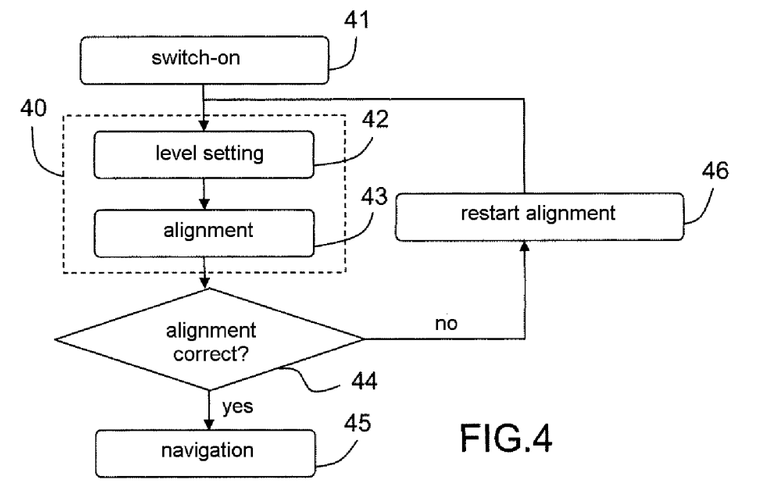
FIG. 4 shows steps used for the alignment of the stand-by instrument.

FIG. 4 shows steps used for the initialization of a stand-by instrument 1. When the stand-by instrument 1 is switched on at step 41, a rough estimation, called level setting 42, of the internal drifts $\vec{d\Omega}_c$ of the inertial measurement unit is carried out. This level setting 42 makes it possible for example to determine a minimal value and a maximal value for each internal gyrometer drift. At the end of the level setting 42, a fine alignment, also called alignment 43, is carried out in order to determine precisely the internal drift of each gyrometer 30. The alignment 43 notably comprises a step of measuring the instantaneous drifts and a step of filtering these drifts in order to obtain precise values of the internal drifts $\vec{d\Omega}_c$. The level setting 42 and the alignment 43 are called global alignment 40. During this global alignment 40, the accelerometers 31 monitor the movements of the inertial measurement unit. At the end of the alignment 43, a check step 44 examines if the movements detected by the accelerometers 31 have not exceeded a predefined threshold and if the internal drifts $\vec{d\Omega}_c$ are between the minimal and maximal values determined during the level setting 42. If such is the case, the internal drifts $\vec{d\Omega}_c$ are recorded in the random access memory 33 of the stand-by instrument 1. The stand-by instrument 1 is ready for the navigation 45 and displays the attitude information of the aircraft 20. In all other cases, the internal drifts $\vec{d\Omega}_c$ are invalidated and the global alignment 40 is restarted as indicated by the reference sign 46.

The steps used in FIG. 4 do not allow a global alignment 40 in all of the situations in which the aircraft 20 can be. In particular, when the movements are repeated, for example because the aircraft 20 is on a moving platform or because it is in flight, the global alignment 40 is always restarted and the stand-by instrument 1 remains unavailable.

Figure 5:
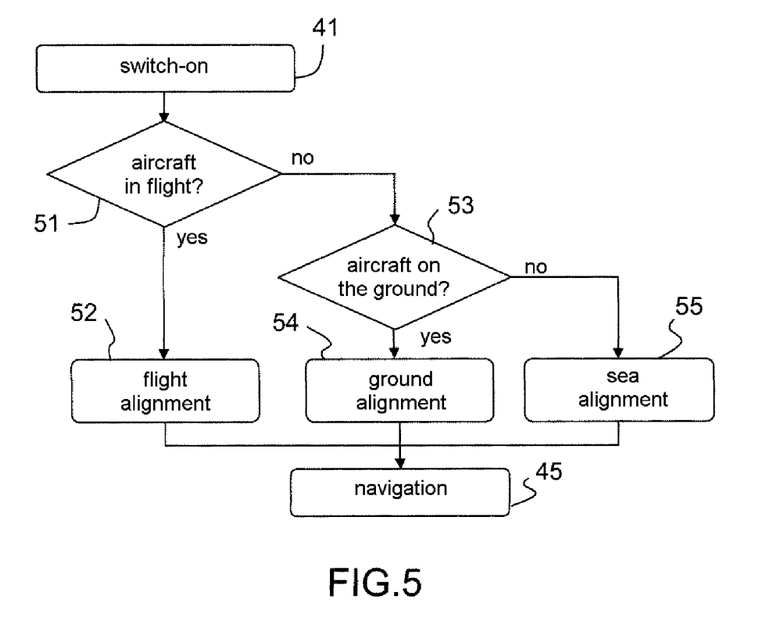
FIG. 5 shows an example of steps used according to the invention for the alignment of the stand-by instrument.

The method according to the invention makes it possible to overcome this disadvantage by steps shown in FIG. 5. When the stand-by instrument 1 is switched on at step 41, a status of the aircraft 20 is determined in a step 51, that is to say whether or not the aircraft 20 is in flight. In the case in which the aircraft 20 is detected as being in flight, a flight alignment 52 is carried out. In the case in which the aircraft 20 is not detected as being in flight, a stability of the aircraft 20 is determined in a step 53, that is to say whether the aircraft 20 is on the ground or at sea. The expression "aircraft on the ground" corresponds to a situation in which the aircraft 20 is standing on a stable support, for example a runway or the roof of a building. The expression "aircraft at sea", on the other hand, corresponds to a situation in which the aircraft 20 is standing on an unstable support, for example an oil rig platform, an aircraft carrier, a helicopter carrier or any other moving platform. In the case in which the aircraft 20 is detected as being on the ground, a ground alignment 54 is carried out. In the case in which the aircraft 20 is not detected as being on the ground, that is to say if it is detected as being at sea, a sea alignment 55 is carried out. At the end of the flight alignment 52, the ground alignment 54 or the sea alignment 55, the stand-by instrument 1 can be used for the determination and the display of the attitude of the aircraft 20 as indicated by the reference sign 45.

In a particular embodiment, the flight alignment 52, the ground alignment 54 and the sea alignment 55 comprise a step of determination of the internal drifts $\vec{d\Omega}_c$ of the inertial measurement unit. These internal drifts $\vec{d\Omega}_c$ can be recorded in the random access memory 33 of the stand-by instrument 1 at the end of the flight 52, ground 54 and sea 55 alignments.

In a particular embodiment, the status of the aircraft 20 is determined by an item of information coming from landing gear of the aircraft 20 and indicating if the wheels of the landing gear are in contact with a support. The status of the aircraft 20 can also be determined by an airspeed surrounding the aircraft 20. This airspeed can be provided autonomously by anemo-barometric sensors of the inertial measurement unit. The aircraft 20 is for example considered as being in flight when the airspeed exceeds 50 knots.

In a particular embodiment, the stability of the aircraft 20 is determined by one or more accelerometers, one or more gyrometers or a combination of accelerometers and gyrometers. Advantageously, the accelerometers 31 and the gyrometers 30 of the inertial measurement unit are used.

In a particular embodiment, the stability of the aircraft 20 is determined by the presence or the absence of a rotation about a yaw axis of the aircraft 20, a translation along this yaw axis, a roll axis and/or a pitch axis of the aircraft 20 or a combination of this rotation and of these translations. These roll, pitch and yaw axes are for example the axes $\vec{X}_a$, $\vec{Y}_a$ and $\vec{Z}_a$ respectively. The presence or the absence of the rotation and of the translations can be determined by a predefined threshold, a rotation or a translation being present when its value exceeds this predefined threshold and absent otherwise. It can also be determined by two predefined thresholds, one negative and the other positive. In this case, a rotation or a translation is present when its value is not included between these two predefined thresholds.

Figure 6:
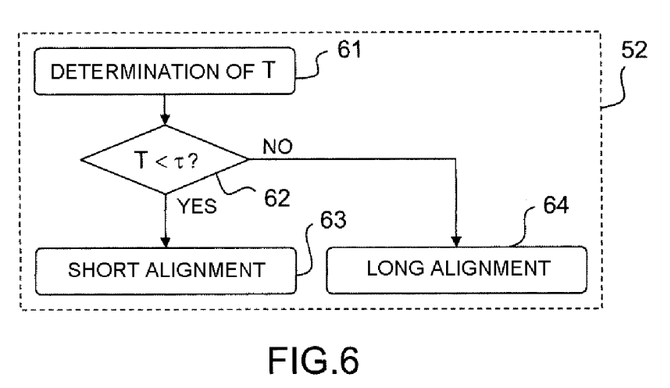
FIG. 6 shows an example of sub-steps used according to the invention for the alignment of the stand-by instrument during a flight of the aircraft.
Figure 7:
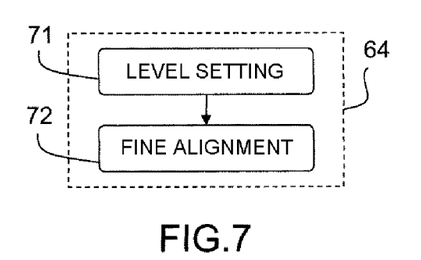
FIG. 7 shows an example of sub-steps used according to the invention for the alignment of the stand-by instrument after a long break in the power supply during a flight of the aircraft.

In a particular embodiment, shown in FIG. 6, the flight alignment 52 can be carried out differently depending on a duration T representing the time elapsed between a switching on of the stand-by instrument 1 and a switching off immediately preceding that switching on. In a step 61, the duration T is determined. In a step 62, it is determined if this duration T is less than or greater than a predetermined duration τ, for example of one or two minutes. In the case where the duration T is less than the duration τ, a short alignment 63 is carried out. In the case where the duration T is greater than or equal to the duration τ, a long alignment 64 is carried out. This embodiment makes it possible to take account of a characteristic of the gyrometers 30 according to which their internal drift can differ between two switch-ons. An internal drift difference is due, notably, to a temperature difference inside the stand-by instrument 1. Consequently, it is possible to consider that after a short interruption on the power supply of the stand-by instrument 1, the internal drifts $\vec{d\Omega}_c$ vary less than after a long interruption. According to this embodiment, the short alignment 63 can comprise a step consisting in reusing the previously determined internal drifts $\vec{d\Omega}_c$. Advantageously, the internal drifts $\vec{d\Omega}_c$ are retained in the random access memory 33, the attitude of the aircraft 20 being able to be determined directly by the stand-by instrument 1 when it is switched on. Still according to this embodiment, the long alignment 64 can comprise a step of determination of minimal and maximal values for each gyrometer internal drift, called level setting 71, and a step of precise determination of the internal drifts $\vec{d\Omega}_c$, called fine alignment 72. The level setting 71 can comprise a measurement of the instantaneous drifts of the gyrometers 30, a determination of a mean value for each internal drift, and a determination of minimal and maximal values for each internal drift from the corresponding mean value and predetermined intervals, the halves of these predetermined intervals being added or subtracted to or from the mean values in order to determine the minimal and maximal values respectively. Advantageously, the fine alignment 72 does not take account of the instantaneous drifts not included between the respective minimal and maximal values of the internal drifts $\vec{d\Omega}_c$. This embodiment is illustrated in FIG. 8.

Figure 8:
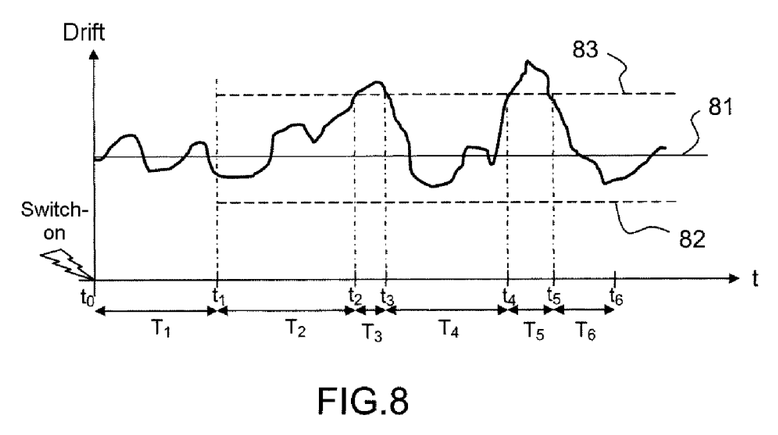
FIG. 8 shows, in the form of a timing diagram, an example of alignment of the stand-by instrument during a flight of the aircraft.

FIG. 8 shows a timing diagram of an example of long alignment 64 of the stand-by instrument 1. Time is represented along the horizontal axis and an instantaneous measurement of an internal gyrometer drift is represented along the vertical axis. A real value 81 of the internal drift, determined by the fine alignment 72 but unknown until the end of that fine alignment 72, is shown by a straight line. When the stand-by instrument 1 is switched on at a time $t_0$, the level setting 71 of the inertial measurement unit is carried out over a period $T_1$, generally of about ten seconds. This level setting 71 makes it possible to define a minimal value 82 and a maximal value 83 for the internal gyrometer drift, this drift having to be determined between these minimal and maximal values 82 and 83. At the end of the level setting 71, at a time $t_1$, the fine alignment 72 of the inertial measurement unit is carried out over a period $T_2$ up to a time $t_2$ starting from which the instantaneous measurement of the internal gyrometer drift becomes greater than the maximal value 83. Throughout the whole of the duration $T_3$, where the instantaneous measurement of the internal drift is greater than the maximal value 83, this instantaneous measurement is not taken into account for the determination of the internal drift. At a time $t_3$, when the instantaneous measurement becomes less than the maximal value 83, the fine alignment 72 resumes over a period $T_4$, that is to say until a time $t_4$ where the instantaneous measurement of the internal drift again becomes greater than the maximal value 83. Throughout the whole of the duration $T_5$ where the instantaneous measurement of the internal drift is greater that the maximal value 83, this instantaneous measurement is not taken into account for the determination of the internal drift. At a time $t_5$, when the instantaneous measurement again becomes less than the maximal value 83, the fine alignment 72 resumes over a period $T_6$, that is to say until a time $t_6$ where the fine alignment 72 ends.

The same mechanism of interruption of the taking into account of the instantaneous measurement of an internal drift can be applied for all of the gyrometers 30 and, in particular, for all of their internal drifts $\vec{d\Omega}_c$. In other words, this interruption makes it possible to not take into account high amplitude movements of the aircraft 20 during the alignment of its inertial measurement unit.

In a particular embodiment, the durations of the ground alignment 54, the sea alignment 55 and the long alignment 64 are predetermined durations. Advantageously, the durations of the sea alignment 55 and of the long alignment 64 are greater than the duration of the ground alignment 54. This embodiment makes it possible to average the movements of the aircraft 20 at sea or in flight over a longer duration in order to obtain precision equivalent to that of the ground alignment 54.

In a particular embodiment, in the case where the aircraft 20 is not detected as being in flight, the method according to the invention furthermore comprises a step of determination of minimal and maximal values for each internal gyrometer drift, called earth level setting. This earth level setting can be identical to the level setting 71 of the long alignment 64.

FIGS. 9 to 14 will be considered for the continuation of this description. These figures show, in the form of timing diagrams, examples of alignment of the inertial measurement unit according to different embodiments in the case where the aircraft 20 is not detected as being in flight. In each figure, an upper timing diagram represents a movement of the inertial measurement unit as a function of time t and a lower timing diagram shows the succession of the steps of the method over this same time t. The movement is for example a translation determined by an accelerometer 31. The movement can also be a rotation determined by a gyrometer 30 or a combination of translations and rotations. In each figure, a predetermined threshold 91 makes it possible to determine the presence or absence of movement of the inertial measurement unit. The figures having an odd number correspond to a situation in which the aircraft 20 is on the ground and the figures having an even number correspond to a situation where the aircraft 20 is at sea.

Figure 9:
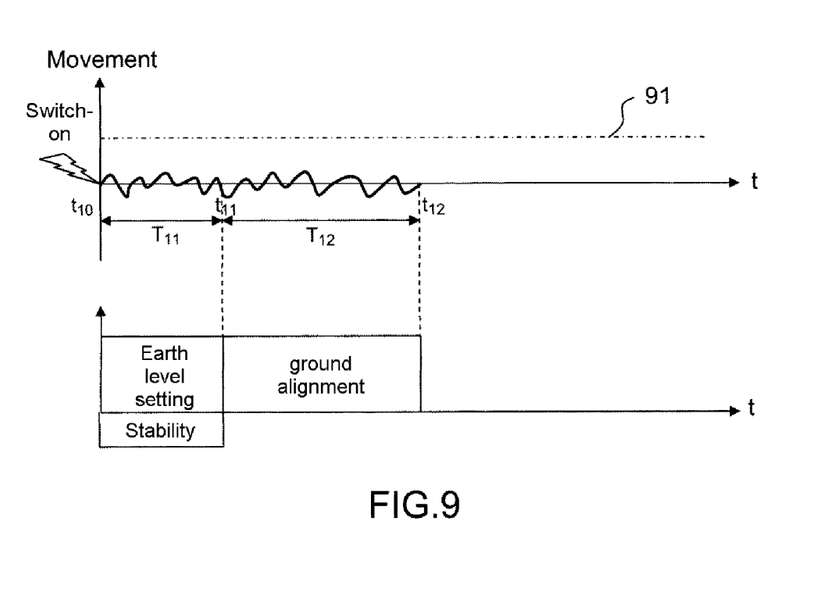
FIG. 9 shows, in the form of a timing diagram, an example of ground alignment of the stand-by instrument according to a first embodiment.
Figure 10:
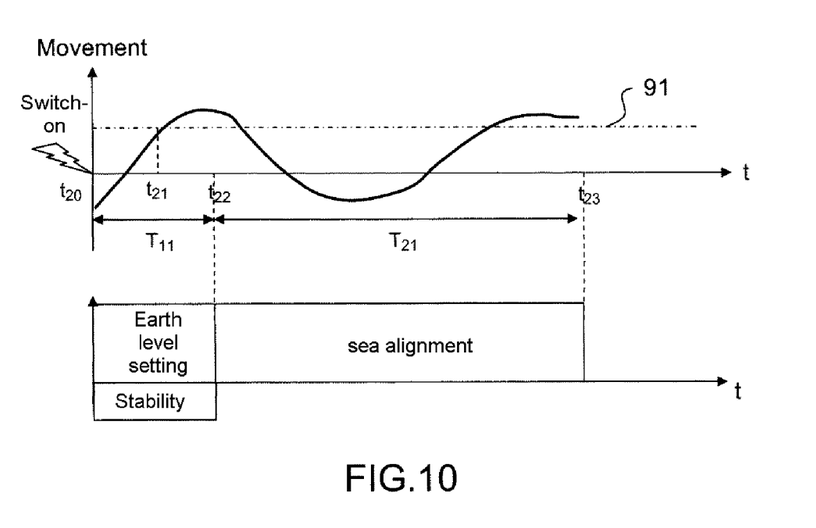
FIG. 10 shows, in the form of a timing diagram, an example of sea alignment of the stand-by instrument according to the first embodiment.

According to a first embodiment, illustrated by FIGS. 9 and 10, in the case where the aircraft 20 is not detected as being in flight, the following steps are carried out successively:
  simultaneously:
    carrying out the earth level setting,
    determining the stability of the aircraft 20 throughout the whole of the duration of the earth level setting,
  in the case where the aircraft 20 is detected as being at sea:
    carrying out a sea alignment 55,
  in the contrary case:
    carrying out a ground alignment 54.

As shown in FIG. 9, when the stand-by instrument 1 is switched on at a time $t_{10}$, the earth level setting is carried out over a period $T_{11}$. The stability of the aircraft 20 is determined throughout this duration $T_{11}$. At the time $t_{11}$, no movement having exceeded the predefined threshold 91, a ground alignment 54 is carried out over a period 12, until a time $t_{12}$.

FIG. 10 illustrates this first embodiment whilst the aircraft 20 is at sea. When the stand-by instrument 1 is switched on at a time $t_{20}$, the earth level setting is similarly carried out over the period $T_{11}$ and the stability of the aircraft 20 is determined. At a time $t_{21}$, a movement exceeds the predefined threshold 91. Consequently, at the end of the earth level setting at a time $t_{22}$, a sea alignment 55 is carried out over a period $T_{21}$ until a time $t_{23}$.

Figure 11:
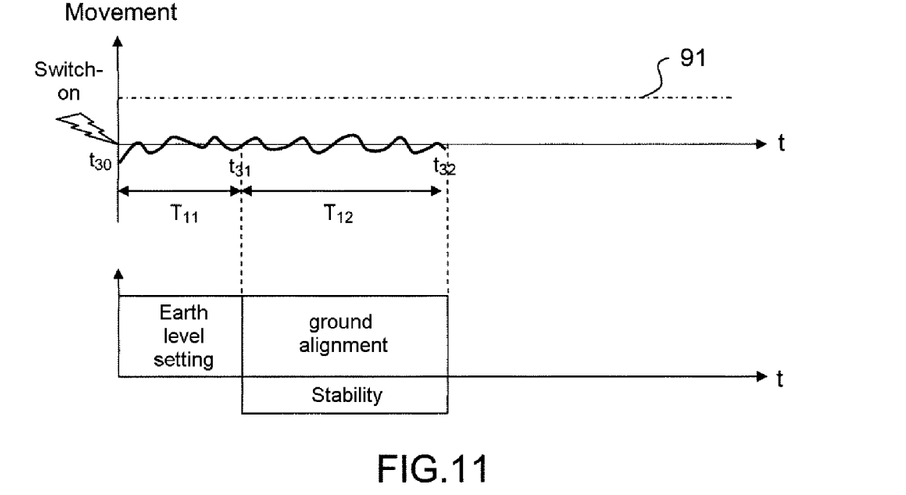
FIG. 11 shows, in the form of a timing diagram, an example of ground alignment of the stand-by instrument according to a second embodiment.
Figure 12:
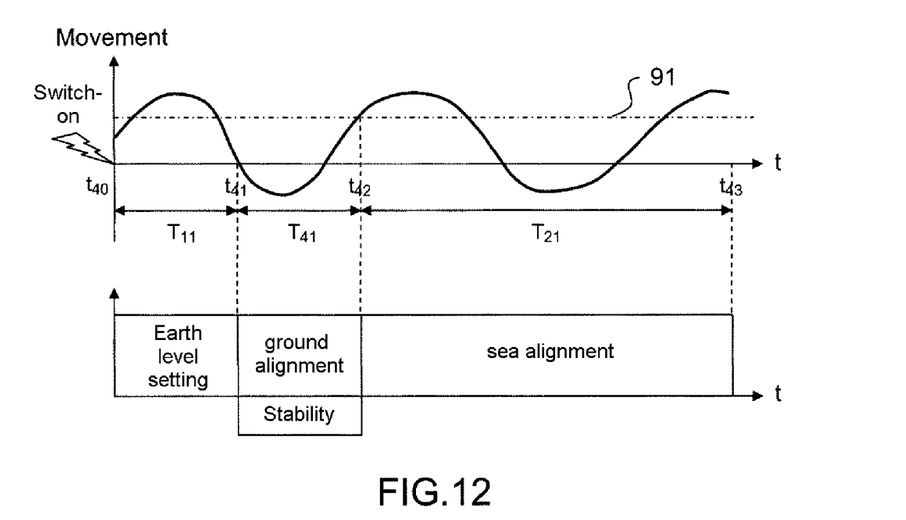
FIG. 12 shows, in the form of a timing diagram, an example of sea alignment of the stand-by instrument according to the second embodiment.

According to a second embodiment, illustrated by FIGS. 11 and 12, in the case where the aircraft 20 is not detected as being in flight, the following steps are carried out successively:
  carrying out the earth level setting,
  simultaneously:
    carrying out a ground alignment 54,
    determining the stability of the aircraft 20 throughout the whole of the duration of the ground alignment 54,
  in the case where the aircraft 20 is detected as being at sea:
    abandoning the ground alignment 54,
    carrying out a sea alignment 55.

As shown in FIG. 11, when the stand-by instrument 1 is switched on, as represented by step 41, at a time $t_{30}$, the earth level setting is carried out over a period $T_{11}$. At the end of the earth level setting, at a time $t_{31}$, a ground alignment 54 is carried out and the stability of the aircraft 20 is determined during the period $T_{12}$ until the time $t_{32}$, no movement having exceeded the predetermined threshold 91.

According to FIG. 12, the earth level setting is likewise carried out over the period $T_{11}$ after the switching on 41 at a time $t_{40}$. At the end of the earth level setting, at a time $t_{41}$, a ground alignment 54 is carried out over a period $T_{41}$ and the stability of the aircraft 20 is determined up to the time $t_{42}$ where a movement exceeds the predetermined threshold 91. Starting from this time $t_{42}$, the ground alignment 54 and the determination of the stability of the aircraft 20 are abandoned and a sea alignment 55 is carried out over a period $T_{21}$ until a time $t_{43}$.

Figure 13:
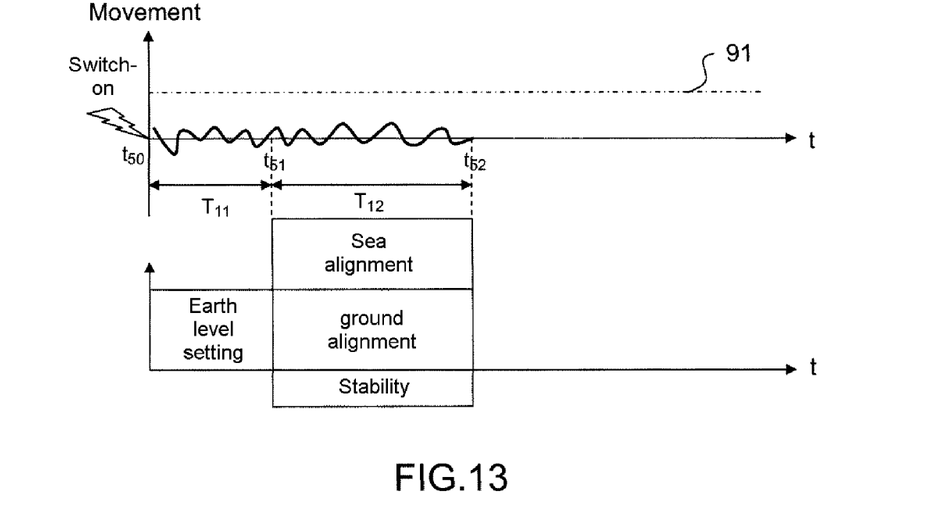
FIG. 13 shows, in the form of a timing diagram, an example of ground alignment of the stand-by instrument according to a third embodiment.
Figure 14:
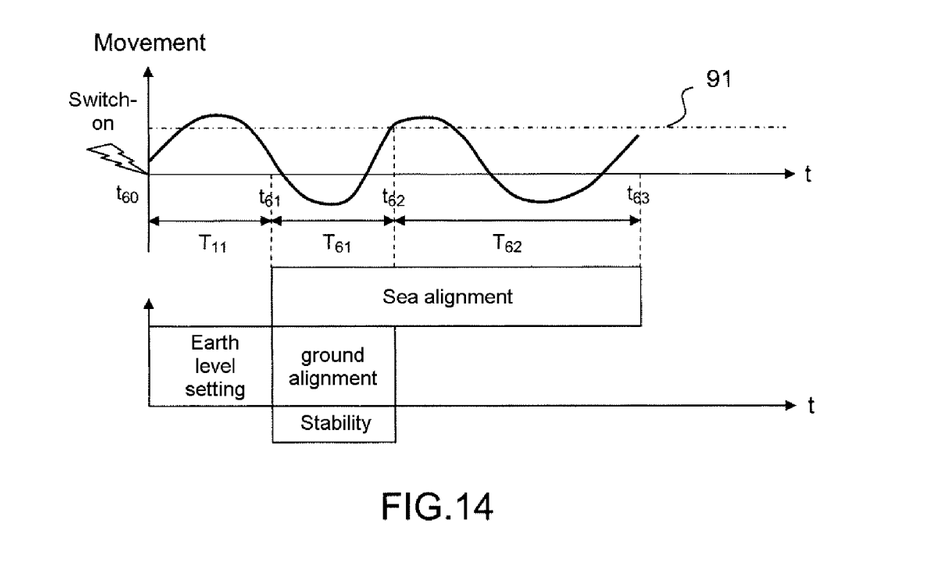
FIG. 14 shows, in the form of a timing diagram, an example of sea alignment of the stand-by instrument according to the third embodiment.

According to a third embodiment, illustrated by FIGS. 13 and 14, in the case in which the aircraft 20 is not detected as being in flight, the following steps are carried out successively:
  carrying out the earth level setting,
  simultaneously:
    carrying out a ground alignment 54,
    carrying out a sea alignment 55,
    determining the stability of the aircraft 20 throughout the whole of the duration of the ground alignment 54,
  in the case where the aircraft 20 is detected as being at sea:
    abandoning the ground alignment 54, the sea alignment 55 then being used,
  in the contrary case:
    abandoning the sea alignment 55, the ground alignment 54 then being used.

As shown in FIG. 13, when the stand-by instrument 1 is switched on, as represented by step 41, at a time $t_{50}$, the earth level setting is carried out over a period $T_{11}$. At the end of this earth level setting, at a time $t_{51}$, a ground alignment 54 and a sea alignment 55 are carried out simultaneously and the stability of the aircraft 20 is determined during the period $T_{12}$ until a time $t_{52}$, no movement having exceeded the predefined threshold 91.

According to FIG. 14, the earth level setting is likewise carried out over the period $T_{11}$ after the switching on 41 at a time $t_{60}$. At the end of this earth level setting, at a time $t_{61}$, a ground alignment 54 and a sea alignment 55 are carried out simultaneously and the stability of the aircraft 20 is determined over a period $T_{61}$ until a time $t_{62}$ where a movement exceeds the predefined threshold 91. Starting from this time $t_{62}$, the ground alignment 54 and the determination of the stability of the aircraft 20 are abandoned and a sea alignment 55 is carried out over a period $T_{62}$ until a time $t_{63}$, the sum of the periods $T_{61}$ and $T_{62}$ being equal to the duration $T_{21}$ of the sea alignment 55.

This third embodiment makes it possible to optimize the duration of the alignment of the inertial measurement unit whilst determining the stability of the aircraft 20 during this alignment duration.

The invention claimed is:

1. A method for independent alignment of an inertial measurement unit for an onboard instrument which can equip an aircraft, the method comprising:
  determining a status of whether the aircraft is in flight, wherein when the aircraft is detected as being in flight, carrying out a flight alignment; and
  when the aircraft is not detected as being in flight, determining a stability of the aircraft to determine whether the aircraft is on the ground or at sea,
  wherein when the aircraft is detected as being on the ground, carrying out a ground alignment, and when the aircraft is detected as being at sea, carrying out a sea alignment.

2. The method according to claim 1, wherein the inertial measurement unit comprises gyrometers and wherein the flight alignment, the ground alignment and the sea alignment comprise determining an internal drift of each gyrometer.

3. The method according to claim 1, wherein the status of the aircraft is determined at least one of an item of information coming from landing gear of the aircraft and indicating if the wheels of the landing gear are in contact with a support and by an airspeed.

4. The method according to claim 1, wherein the stability of the aircraft is determined by at least one of an accelerometer and a gyrometer.

5. The method according to claim 1, wherein the stability of the aircraft is determined by the presence or the absence of at least one of a rotation about a yaw axis of the aircraft, a translation along the yaw axis of the aircraft, a translation along a roll axis of the aircraft, and a translation along a pitch axis of the aircraft.

6. The method according to claim 5, wherein the presence or the absence of the at least one of the rotation about the yaw axis of the aircraft, a the translation along the yaw axis of the aircraft, the translation along the roll axis of the aircraft, and the translation along the pitch axis of the aircraft are determined by a predetermined threshold.

7. The method according to claim 1, wherein the flight alignment comprises the following steps:
determining a time elapsed between a switching on of the onboard instrument and a switching off immediately preceding that switching on, wherein when the time is less than a predetermined duration, carrying out a short alignment, and when the time is greater than the predetermined duration, carrying out a long alignment.

8. The method according to claim 7, wherein the short alignment comprises using internal drifts determined from the inertial measurement unit.

9. The method according to claim 7, wherein the long alignment comprises determining minimal and maximal values of internal drifts of the inertial measurement unit, and
precisely determining the internal drifts.

10. The method according to claim 9, wherein precisely determining the internal drifts for the long alignment does not take account instantaneous drifts of the inertial measurement unit not included between the minimal and maximal values of the internal drifts.

11. The method according to claim 7, wherein the ground alignment, the sea alignment, and the long alignment each take place over a predetermined duration, wherein durations of the sea alignment and the long alignment are greater than a duration of the ground alignment to average the movements of the aircraft.

12. The method according to claim 1, wherein when the aircraft is not detected as being in flight, the method furthermore comprises determining minimal and maximal values of internal drifts of the inertial measurement unit.

13. The method according to claim 12, wherein in the case where the aircraft is not detected as being in flight, the following steps are carried out:
simultaneously determining the minimal and maximal values of the internal drifts of the inertial measurement unit; and
determining the stability of the aircraft throughout the whole of the duration of determination of the minimal and maximal values of the internal drifts of the inertial measurement unit;
wherein in the case where the aircraft is detected as being at sea, carrying out a sea alignment, and in the contrary case, carrying out a ground alignment.

14. The method according to claim 12, wherein, in the case where the aircraft is not detected as being in flight, the following steps are carried out:
determining the minimal and maximal values of the internal drifts of the inertial measurement unit; and
simultaneously:
carrying out the sea alignment; and
determining the stability of the aircraft throughout the whole of the duration of the ground alignment, wherein when the aircraft is detected as being at sea, abandoning the ground alignment, and carrying out the sea alignment.

15. The method according to claim 12, wherein, in the case where the aircraft is not detected as being in flight, the following steps are carried out:
determining the minimal and maximal values of the internal drifts of the inertial measurement unit; and
simultaneously:
carrying out the ground alignment;
carrying out the sea alignment; and
determining the stability of the aircraft throughout the whole of the duration of the ground alignment, wherein when the aircraft is detected as being at sea, abandoning the ground alignment, and using the sea alignment, and when the aircraft is on the ground, abandoning the sea alignment, and using the ground alignment.

16. The method according to claim 1, wherein the onboard instrument is a stand-by instrument for generating and displaying speed, altitude and attitude information of the aircraft.

* * * * *

UNITED STATES PATENT AND TRADEMARK OFFICE
CERTIFICATE OF CORRECTION

PATENT NO. : 8,607,613 B2  Page 1 of 1
APPLICATION NO. : 12/809589
DATED : December 17, 2013
INVENTOR(S) : Kerbiquet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 779 days.

Signed and Sealed this
Twenty-second Day of September, 2015

Michelle K. Lee
*Director of the United States Patent and Trademark Office*